United States Patent Office 3,347,421
Patented Oct. 17, 1967

3,347,421
PLURAL SOURCE DISPENSER FOR SINGLE MIXED DRINKS
Thomas O. Yingst, Pevely, and Leonard P. Traxel, Affton, Mo., assignors to Universal Match Corporation, St. Louis, Mo., a corporation of Delaware
Filed July 14, 1965, Ser. No. 471,967
20 Claims. (Cl. 222—129.1)

Among the several objects of this invention may be noted the provision of improved apparatus of the class described adapted to hold a supply of beverage ready-mixed for dispensing, and to replenish this supply in response to dispensing of a quantity (a drink) of the beverage by automatically mixing water and syrup to replenish the quantity of beverage dispensed; the provision of such apparatus adapted for dispensing carbonated and uncarbonated beverages and for dispensing carbonated beverages of different degrees of carbonation; the provision of such apparatus having an improved carbonator for carbonating water to a predetermined degree of carbonation for dispensing high-carbonated drinks and to be mixed with uncarbonated water (tap water) to provide carbonated water having lower degrees of carbonation for dispensing low-carbonated drinks, the carbonator being adapted to prevent overcarbonation of the water as might otherwise occur during a prolonged idle period (a quiescent period of nonwithdrawal of carbonated water from the carbonator), the carbonator per se being useful in other apparatus; the provision of such apparatus having improved means for controlling the supply of water to the carbonator; the provision of such apparatus having improved means for blending carbonated water from the carbonator with tap water to supply water of intermediate degrees of carbonation for mixing with syrup to dispense low-carbonated drinks, and which includes valve means adapted to be set for supplying high carbonated water for high carbonated drinks, or water with intermediate degrees of carbonation for low-carbonated drinks, or tap water for uncarbonated drinks; and the provision of such apparatus adapted for use either for manual dispensing or coin-operated dispensing of beverages. Other objects and features will be in part apparent and in part pointed out hereinafter.

The invention accordingly comprises the constructions hereinafter described, the scope of the invention being indicated in the following claims.

In the accompanying drawing, in which one of various possible embodiments of the invention is illustrated:

Corresponding reference characters indicate corresponding parts throughout the several views of the drawings.

Figure 1:
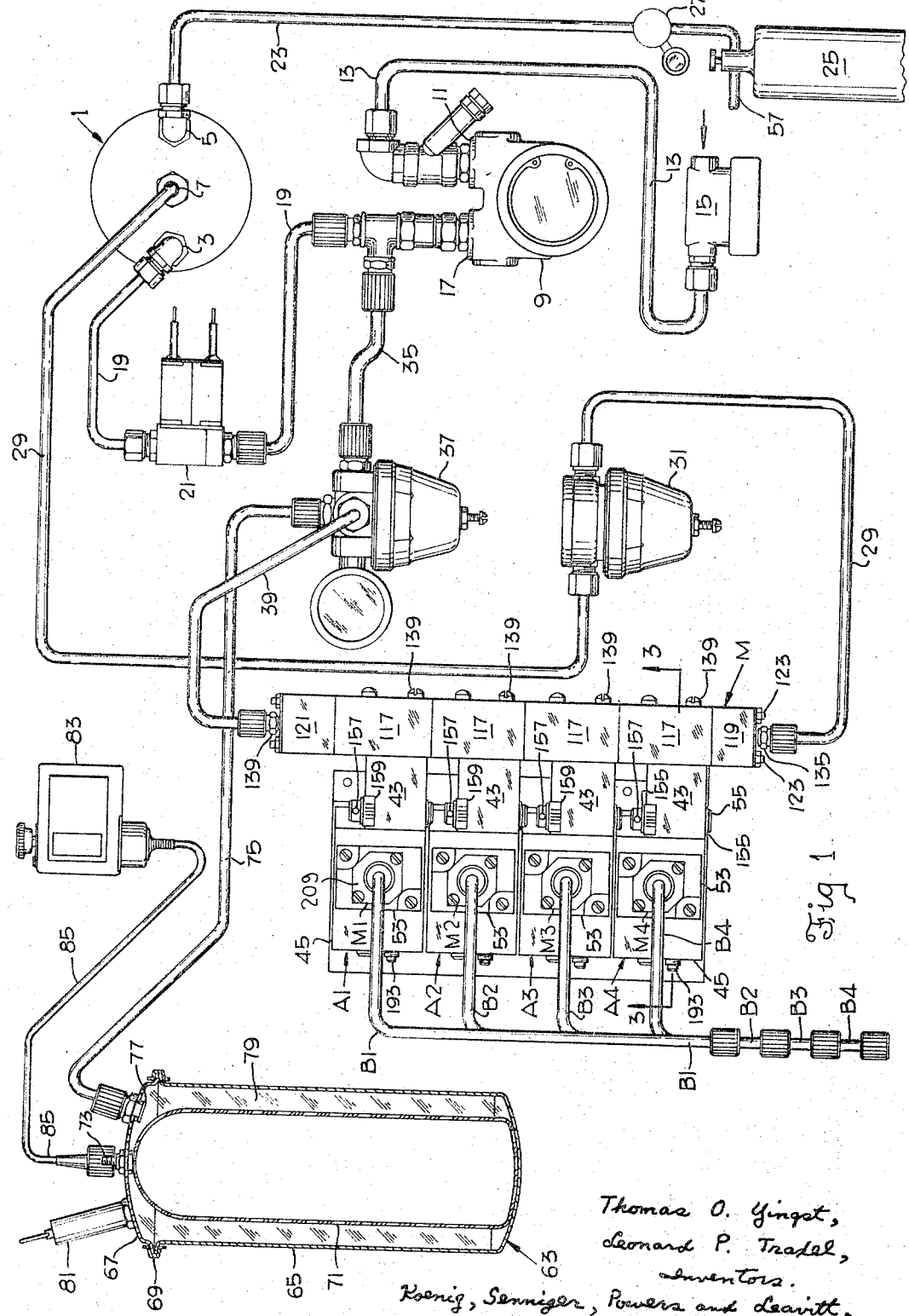
FIG. 1 is a view showing a beverage dispensing apparatus of this invention, showing a tap water receiving and dispensing tank of the apparatus in section.

Referring to the drawings, first more particularly to FIG. 1, there is generally indicated at 1 a carbonator having an inlet 3 for tap water, an inlet 5 for carbon dioxide gas ($CO_2$ gas), and an outlet 7 for carbonated water. A pump 9 is provided for pumping tap water into the carbonator, the pump having an inlet 11 to which is connected a tap water supply line 13 having a suitable pressure regulator 15 therein. Outlet 17 of the pump is connected to inlet 3 of the carbonator by a tap water line 19 which has a solenoid valve 21 therein. This valve is a shut-off valve; when it is opened, tap water may be delivered into the carbonator. $CO_2$ gas is supplied to the gas inlet 5 of the carbonator via a $CO_2$ line 23 from a tank fragmentarily indicated at 25 containing pressurized $CO_2$ gas. Line 23 may include a suitable pressure regulator 27.

A carbonated water delivery line 29 having a pressure regulator 31 connected therein extends from the carbonated water outlet 7 of the carbonator to an elongate carbonated water chamber 33 (see FIG. 2) in an elongate manifold designated in its entirety by the reference character M. A tap water line 35 extends from the outlet 17 of pump 9 to the inlet of a pressure regulator 37 and a tap water line 39 extends from the outlet of this pressure regulator to an elongate tap water chamber 41 (see FIG. 2) in the manifold. Manifold chambers 33 and 41, which hold under pressure supplies of carbonated water and tap water, respectively, are adapted to supply carbonated water and tap water to a plurality of blender and mixer assemblies, each designated generally by the reference character A, attached to the manifold. Four such blender and mixer assemblies, specifically designated A1, A2, A3 and A4, are shown in FIG. 1 by way of example. The manifold, as will appear, is adapted to be readily extended to accommodate a greater number of such assemblies.

Each of the blender and mixer assemblies A1–A4 comprises a blender valve body 43, a body 45 for a flow control valve 47 for water, a body 49 for a flow control valve 51 for syrup, and a mixer 53 (see particularly FIGS. 1–4). The blender valve body 43 has a blender valve 55 therein rotatable between a first limit for flow of carbonated water only from manifold chamber 33 through body 45 to the mixer body and a second limit for flow of tap water only from manifold chamber 41 through body 45 to the mixer, and having an unlimited range of intermediate positions for blending carbonated water and tap water in different proportions for supplying water of various degrees of carbonation to the mixer. The mixers of assemblies A1, A2, A3 and A4 are specially designated M1, M2, M3 and M4, respectively.

Figure 2:
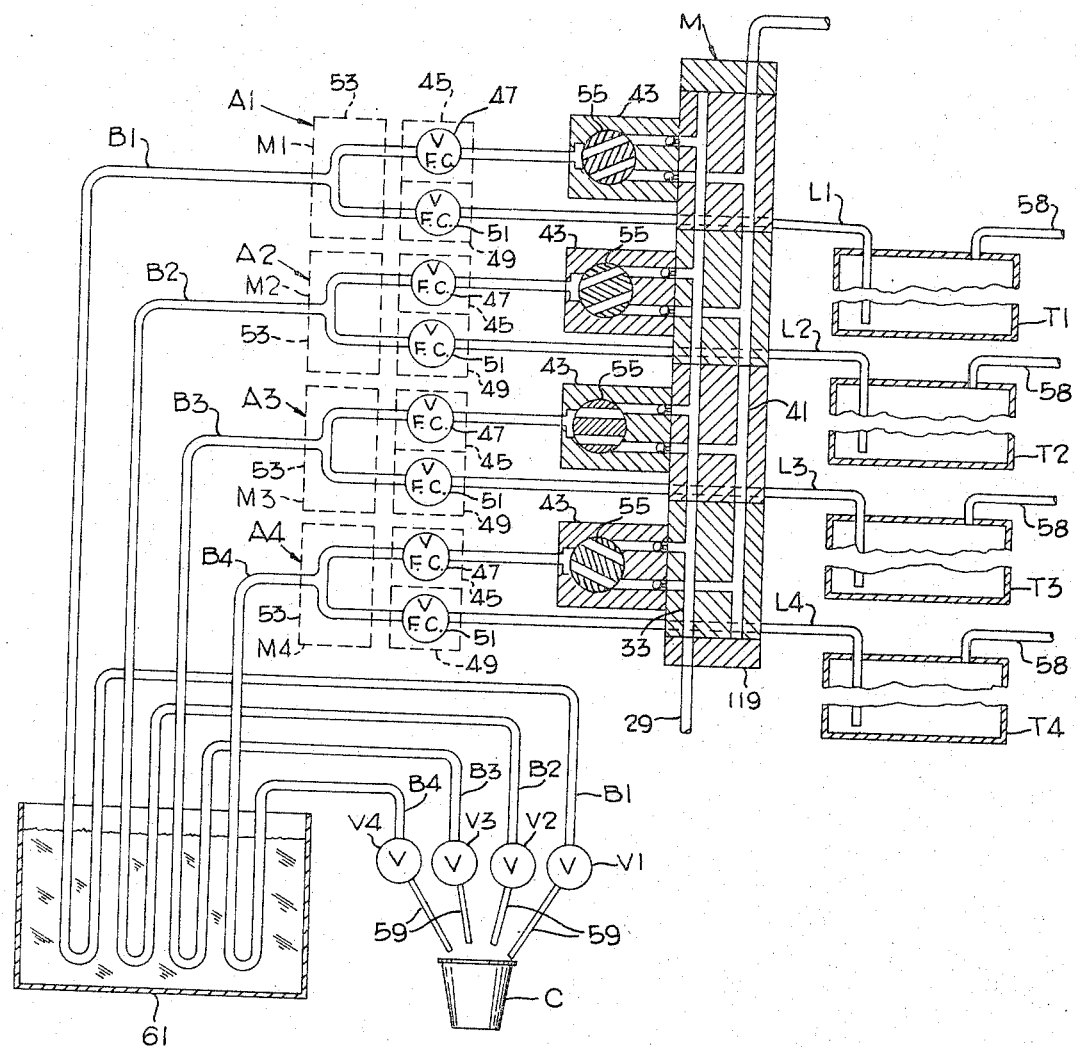
FIG. 2 is a schematic view of the apparatus.

As shown in FIG. 2, four syrup tanks T1, T2, T3 and T4 are provided, one for each of the assemblies A1, A2, A3 and A4. These tanks are pressurized by $CO_2$ gas from the $CO_2$ tank 25 via a line 57 from tank 25 (which may have a pressure regulator connected therein) and branch lines indicated at 58 in FIG. 2. Syrup delivery lines L1, L2, L3 and L4 connect the syrup tanks to the mixers 53 of the respective assemblies A1, A2, A3 and A4. Beverage delivery lines B1, B2, B3 and B4 extend from the outlets of the mixers 53 of the respective assemblies A1–A4 and terminate at dispensing valves V1, V2, V3 and V4, each of which has a nozzle 59 for delivering the beverage dispensed on opening thereof into a cup indicated at C. Valves V1–V4 may be manually operated in the case of a manual beverage dispenser, or electrically operated in the case of a coin-operated beverage vendor. They are herein described as manually operated valves for purposes of illustration.

As shown in FIG. 2, the beverage delivery lines B1–B4 pass through a cooling tank 61 for cooling the beverages therein. This tank may be a conventional "sweet-water bath," containing a cooling coil which freezes water in the tank into a block of ice. Other suitable cooling means may be provided for cooling the beverages between the mixers and the dispensing valves.

Figure 8:
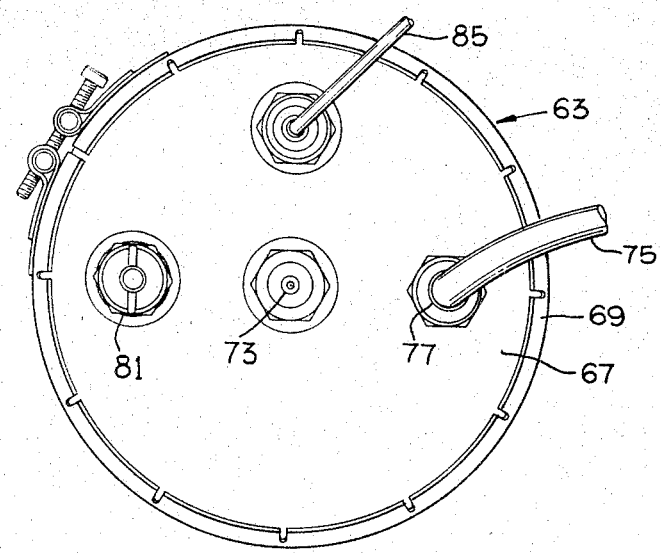
FIG. 8 is an enlarged plan of the control tank.

At 63 in FIGS. 1 and 8 is indicated a tap water receiving and dispensing tank comprising a body 65 and a closure 67 for the body held thereon by a channel-section split clamping ring 69. Within the tank is an inflated bladder 71 (e.g., a rubber bladder) which is sealed from the interior of the tank. The bladder is adapted to be inflated via an inflating valve 73 (which may be a conventional tire valve) mounted in the center of closure 67 and having the bladder secured to its inner end on the inside of the closure. A tap water line 75 is interconnected between the tap water line 35 extending from the outlet of pump 9 and a port 77 in the closure 67. Tap water is adapted to enter the chamber 79 in tank 63 surrounding the inflated bladder via line 75 and port 77, and to exit from this space via port 77 and line 75. Line 75 interconnects with line 35 upstream from the inlet of pressure regulator 37 so that water in line 75 is not subject to regulation by pressure regulator 37. Tank 63 has a safety valve 81 on closure 67. At 83 is indicated a control switch which is responsive to the pressure of water in space 79 in tank 63 via an interconnection 85 between closure 67 and the switch. Switch 83 is adapted to close when the pressure of water in tank 63 reaches a lower limit (e.g., 120 p.s.i.) and to open when the pressure of water in tank 63 reaches an upper limit (e.g., 150 p.s.i.).

Figure 7:
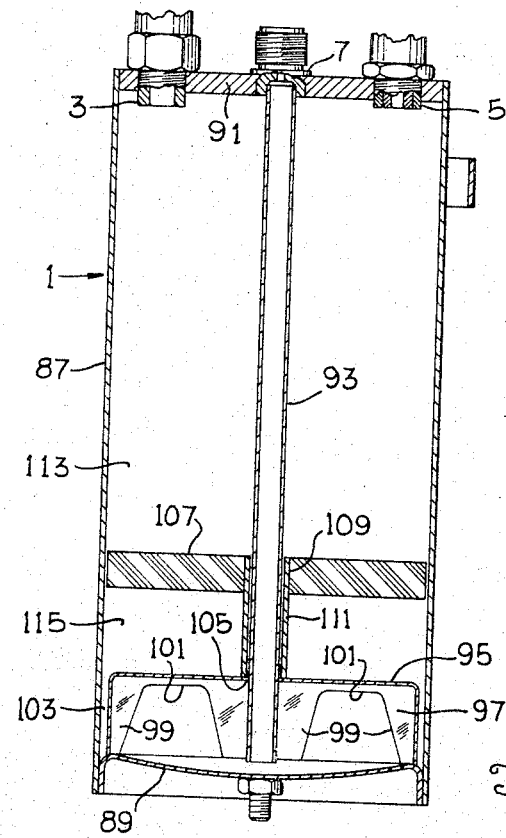
FIG. 7 is a vertical section of the carbonator of the apparatus.

As shown in FIG. 7, the carbonator 1 comprises a pressure vessel having a cylindric body 87, a bottom closure head 89 and a top closure head 91. The tap water inlet 3 and the $CO_2$ gas inlet 5 are in the top head 91. The carbonated water outlet 7 is in the center of the top head, and has a pipe 93 extending down therefrom to near the bottom 89. A circular baffle or partition plate 95 is located in the carbonator adjacent but spaced above the bottom 89, providing what may be referred to as a quiescent zone 97 between the bottom and the baffle. As illustrated in FIG. 7, the baffle has downturned legs 99 at its periphery which bear on the bottom 89 to space the baffle above the bottom, with spaces 101 between the legs for entry of water to the quiescent zone. The diameter of the baffle is somewhat less than the inside diameter of cylindric body 89 of the carbonator so that there is clearance at 103 between the legs 99 and the body 89 for restricted communication between the space in the carbonator above the baffle and the quiescent zone via the spaces 101 between the legs. The baffle has a center hole 105 receiving the pipe 93, the baffle being thereby held centered in the carbonator.

A disk-shaped float 107 is freely slidable up and down on pipe 93 in the space in the carbonator above the baffle. This float is preferably made of a material having a specific gravity only slightly less than that of water, so as to have low buoyancy. A low density polyethylene, having a specific gravity of about 0.910 to 0.925 has been found most suitable for use as the material of the float. The float has a center hole 109 in which is press-fitted the upper end of a sleeve 111, the latter having a freely sliding fit on the pipe 93, and extending down from the float surrounding the pipe to constitute a spacer for spacing the float a predetermined distance above the baffle when the float sinks by engagement of the lower end of the sleeve with the baffle. The sleeve may be made of the same material as the float, or of other material of similar specific gravity. The diameter of the float is slightly less than the inside diameter of body 87 of the carbonator to provide for restricted communication between the space 113 in the carbonator above the float and the space 115 below the float.

As shown in FIG. 1, manifold M comprises a series of individual manifold blocks, each designated 117 held in end-to-end relation with heads 119 and 121 at the ends of the series of blocks by through bolts 123. Each manifold block has two longitudinal bores 125 and 127 (see FIG. 3). Bores 125 of the blocks are aligned to provide the elongate carbonated water manifold chamber 33; bores 127 are aligned to provide the elongate tap water manifold chamber 41. As illustrated herein, with four blender and mixer assemblies A1–A4 for dispensing four different drinks, there are four manifold blocks 117 in the manifold assembly. However, it is a simple matter to make up the manifold with any number of blocks for any desired number of blender and mixer assemblies.

Each manifold block has a transverse passage 129 for carbonated water from the bore 125 to the blender valve body face 131 of the block, and a transverse passage 133 for tap water from bore 127 to the face 131. Line 29 is connected to a fitting 135 in manifold head 119, this fitting communicating through this head to the bore 125 in the adjacent block 117. Line 39 is connected to a fitting 137 in manifold head 121, this fitting communicating through this head to the bore 127 in the adjacent block 117.

Figure 3:
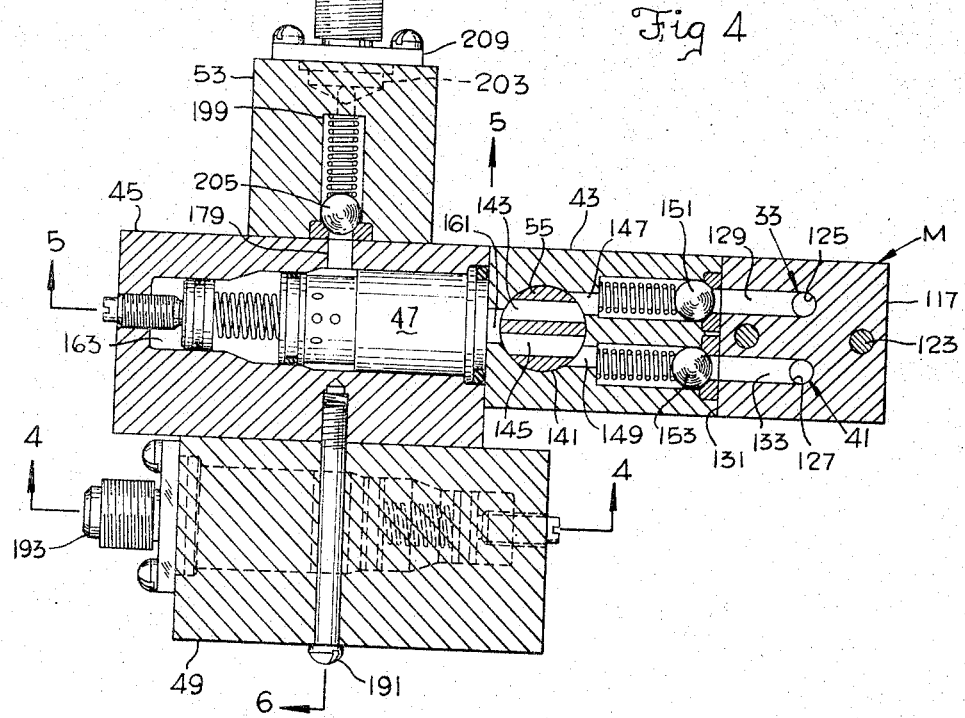
FIG. 3 is an enlarged section on line 3—3 of FIG. 1.
Figure 5:
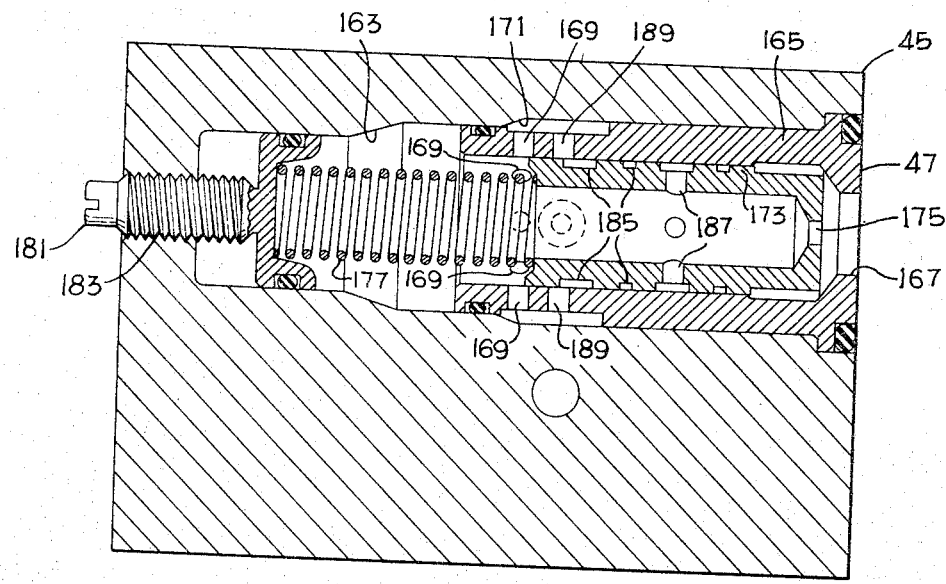
FIG. 5 is an enlarged section on line 5—5 of FIG. 3.
Figure 6:
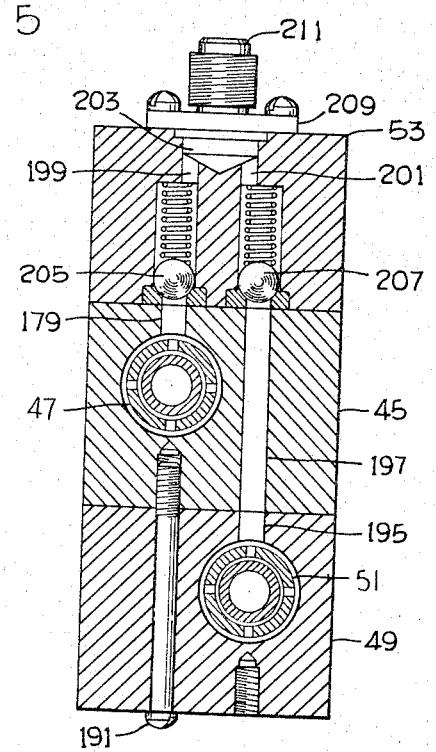
FIG. 6 is an enlarged section on line 6—6 of FIG. 3.

Each blender valve body 43 is secured against face 131 of the respective manifold block 117 by screws such as indicated at 139 in FIG. 1 passing transversely through block 117. As shown in FIG. 3, body 43 has a cylindric cavity 141 therein from one side to the other in which the blender valve 55, which comprises a solid cylinder having two transverse passages or ports 143 and 145, is rotatable with a sealing fit. Ports 143 and 145 extend side-by-side parallel to one another on opposite sides of a diametrical plane of the cylindric valve 55. Body 43 has a carbonated water inlet passage 147 in continuation of passage 129 and a tap water inlet passage 149 in continuation of passage 133 extending side-by-side to the cavity 141. Spring-biased check valves 151 and 153 are provided in passages 147 and 149 to prevent back flow from these passages to passages 129 and 133. The cylindric blender valve 55 is held in the cavity 141 by having split rings 155 snapped in grooves adjacent its ends (see FIG. 1), these rings engaging the sides of the body 43, and one end of the valve 55 projects from one side of body 43 and has a handle 157 extending radially therefrom for turning the valve. Handle 157 also serves as a pointer in conjunction with index markings on an indicator plate 159 provided on the body 43 to indicate the setting of the valve 55. Body 43 has an outlet 161 (see FIG. 3) extending from the cavity 141 in the central plane between inlets 147 and 149.

Valve 55 is rotatable in hole 141 between a first position wherein port 143 is in full register with carbonated water inlet 147 and outlet 161, and wherein port 145 is blocked, and a second position wherein port 145 is in full register with tap water inlet 149 and outlet 161, and wherein port 143 is blocked. Valve 55 may also be set in various intermediate angular positions wherein both ports 143 and 145 are in partial register with the respective inlets 147 and 149 for blending of carbonated water flowing from inlet 147 through port 143 to outlet 161 with tap water flowing from inlet 149 through port 145 to provide carbonated water of various degrees of carbonation (less than that of the carbonated water entering via inlet 147) at the outlet 161. The proportion of carbonated water and tap water supplied to outlet 161 and hence the degree of carbonation of the water exiting from outlet 161 depends on the relative amounts of opening of ports 143 and 145 to the respective inlets 147 and 149. As shown in FIG. 3, valve 55 is in its mid-position, ports 143 and 145 are equally open to ports 147 and 149, and the proportion of carbonated water and tap water supplied to outlet 161 is one to one. By turning valve 55 counterclockwise from its mid-position of FIG. 3, the proportion of carbonated water to tap water is increased for higher degrees of carbonation of water exiting from outlet 161, and by turning valve 55 clockwise from its mid-position of FIG. 3, the proportion of tap water to carbonated water is increased for lower degrees of carbonation of water exiting from outlet 161. Valve 55 may also be turned off.

The flow control valve body 45 comprises a block held on the outlet end of the blender valve body 43 by screws 139 and having a longitudinally extending recess 163 accommodating the water flow control valve 47. This flow control valve is of a convention type providing for a substantially constant rate of flow of water despite variations in the pressure of the water delivered via outlet 161. Generally, it comprises a cylinder 165 received in the recess having an inlet opening 167 at its inlet end (through which water enters from outlet 161). Cylinder 165 has a series of radial ports 169 adjacent its other end for communication from the interior of the cylinder to an annular space 171 in body 45 around the cylinder. A tubular piston valve member 173 is axially slidable in the cylinder. This valve member 173 has a reduced inlet orifice 175 at its end toward the cylinder inlet 167, which is dimensioned in accordance with the desired flow rate of the flow control valve. A spring 177 biases the valve member in the direction toward the inlet end of the cylinder, and to a limiting position wherein the inner end of the valve member completely clears the ports 169 for full flow of water through ports 169 and annular space 171 to exit through a radial outlet 179 in the body 45 for delivery to the respective mixer M1, M2, M3, M4. Spring 177 reacts from an adjusting screw member 181 threaded in a tapped hole 183 in body 45 at the end of recess 163 away from its inlet end. The valve member is externally grooved as indicated at 185 and ported as indicated 187, and cylinder 165 is ported as indicated at 189 for hydraulically balancing the valve member. The arrangement is such that on any increase in pressure differential of water between the inlet 167 and outlet 179, the valve member 173 moves inward against the bias of spring 177 to reduce the flow through ports 169 in such manner as to maintain a substantially constant rate of flow of water.

The flow control valve body 49 comprises a block held against a face of body 45 by screws as indicated at 191. Body 49 is identical to body 45, and the flow control valve 51 therein is identical to the flow control valve 47 as above described. A fitting 193 provides for connection of the respective syrup supply line T1, T2, T3, T4 to deliver syrup to the inlet 167 of the flow control valve 51. Syrup exits from body 49 through outlet 195 in body 49 (which corresponds to outlet 179 of body 45) and body 45 has a passage 197 for flow of syrup therethrough to the respective mixer 53.

Each mixer 53 comprises a block secured on the outlet face of body 45, having a passage 199 for water in continuation of outlet 179 and a passage 201 for syrup in continuation of passage 197, these passages leading to a mixing chamber 203 in the body. Spring-biased check valves 205 and 207 are provided in passages 199 and 201 for preventing back flow of beverage into outlet 179 and passage 197. Chamber 203 is closed by a cap 209 having a nipple 211 for connection of the respective beverage delivery line B1, B2, B3, B4.

Figure 9:
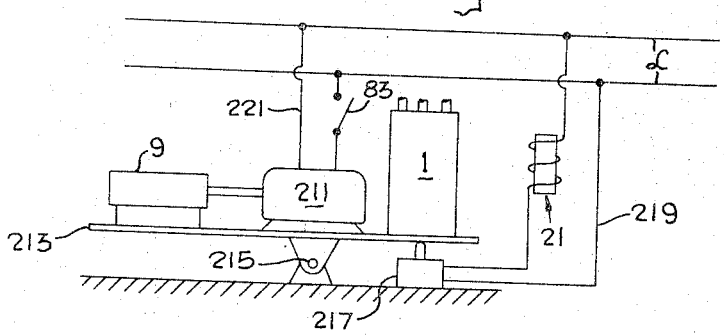
FIG. 9 is a view showing the carbonator mounting arrangement and associated electrical circuitry.
Figure 4:
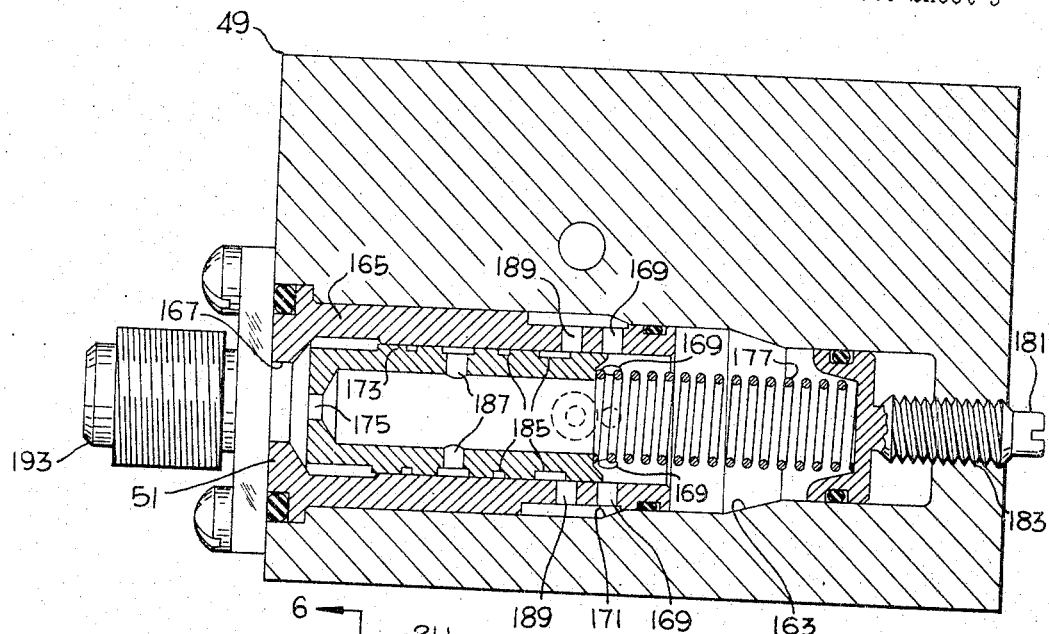
FIG. 4 is an enlarged section on line 4—4 of FIG. 3.

Referring to FIG. 9, the carbonator 1, the pump 9 and an electric motor 211 for driving the pump 9 are shown to be mounted on a platform 213 which is pivoted at 215 in such manner that the weight of the carbonator (and water therein) is brought to bear on a control switch 217. When the carbonator is full of carbonated water, switch 217 is open. When the carbonated water in the carbonator drops below a predetermined level, the right end of the platform as shown in FIG. 9 swings up to effect closure of the switch. The switch is interconnected with the solenoid of solenoid valve 21 as indicated at 219 across a line L. Motor 211 is interconnected with pressure switch 83 as indicated at 221 across the line L. The arrangement is such that on demand for water by the carbonator, switch 217 closes to energize and open the valve 21, and on closure of pressure switch 83, motor 211 is energized to drive the pump.

Operation is as follows:

It will be understood that in normal operation of the dispensing system, there will be a ready-mixed supplies of beverages of different flavors standing under pressure in mixers M1, M2, M3 and M4 and in beverage delivery lines B1, B2, B3 and B4 down to the dispensing valves V1, V2, V3 and V4. The carbonator 1 will contain a supply of carbonated water having a desired high carbonation factor (e.g., a factor of 4.0, meaning a ratio of volume of gas to volume of water of 4.0 to 1). Tank 63 will contain tap water pressurized by the inflated bladder 71.

It may be assumed, for example, that mixers M1 and M2 are to supply high carbonated drinks, that mixer M3 is to supply a low carbonated drink, and that mixer M4 is to supply an uncarbonated drink. In such case, blender valves 55 of the first two blenders 43 associated with mixers M1 and M2 are set for flow of carbonated water only from carbonated water manifold chamber 33 to the mixers M1 and M2. The blender valve 55 of the third blender is set for flow of both carbonated water and tap water to the mixer M3 from manifold chambers 33 and 41 in the necessary proportion according to the low degree of carbonation desired. The blender valve 55 of the fourth blender is set for flow of tap water only from chamber 41 to the mixer M4.

Assuming, for example, that dispensing valve V1 is opened for dispensing the high carbonated beverage of the first flavor held in line B1 and mixer M1 into a cup at C, the beverage flows out into the cup under the pressure provided in the system by the pressure of $CO_2$ gas in the carbonator 1. High carbonated water flows from the carbonator 1 via line 29 to manifold chamber 33, from chamber 33 via passages 129 and 147, port 143 in blender valve 55, blender outlet 161, flow control valve 47, and passage 179 of assembly A1 to mixer M1. It continues through passage 199 of mixer M1 to the mixing chamber 203 of the latter. Syrup flows from syrup tank T1 via line L1 through flow control valve 51 of assembly A1, thence through passages 195, 197 and 201 to the mixing chamber 203 of mixer M1. The high carbonated water and syrup mix in mixing chamber 203 to constitute the high carbonated beverage of the first flavor, thereby to replenish the amount of beverage of this flavor drawn off by the opening of dispensing valve V1. The syrup is delivered from tank T1 on account of the drop in pressure in line B1 which occurs on opening of valve V1, enabling $CO_2$ pressure in tank T1 to force syrup out of this tank. Flow control valve 51 provides for flow of syrup at the appropriate rate in order to deliver the amount of syrup needed in proportion to the amount of carbonated water.

Dispensing of beverage from lines B2, B3 and B4 and replenishment of beverage in these lines occurs on operation of dispensing valves V2, V3, V4 in a manner similar to that above described except that, as to B3, high carbonated water and tap water are blended in the blender of assembly A3 to supply low carbonated water and, as to B4, tap water alone is supplied to mixer M4 to provide an uncarbonated beverage. Tap water in manifold chamber 41 is under pressure as a result of pressurization of tap water in tank 63 by bladder 71. Accordingly, when dispensing valve V3 is opened, tap water flows from chamber 41 through the blender of assembly A3 to mixer M3, and when dispensing valve V4 is opened, tap water flows from chamber 41 through the blender of assembly A4 to mixer M4. The result of flow of tap water out of chamber 41 is to reduce the pressure of tap water in tank 63. Upon reduction of this pressure below the lower pressure limit of switch 83 (e.g., 120 p.s.i.), switch 83 closes. This energizes motor 211 to drive pump 9 to deliver tap water to tank 63 via lines 35 and 75 to bring the tap water pressure back up and sustain the requisite flow of tap water.

Shut-off valve 21 remains closed until the supply of carbonated water in carbonator 1 is depleted to the point where the right end of platform 213 carrying the carbonator swings up far enough to effect closure of switch 217, whereupon valve 21 opens. When this valve 21 opens, tap water flows out of tank 63 into the carbonator via lines 75, 35, 19 under the pressure of bladder 71. This drops the tap water pressure in tank 63 and switch 83 and the latter closes to effect operation of pump 9 to deliver tap water to the carbonator 1 and the tank 63. Pump 9 remains in operation until tap water pressure is built back up in tank 63 to the upper pressure limit (e.g., 150 p.s.i.) of switch 83. If the carbonator demand has not been fully satisfied when the pump shuts off, the remainder of the tap water needed to satisfy the carbonator demand is supplied from the tank 63. When the carbonator demand is satisfied, switch 217 opens to deenergize and close the shut-off valve 21. Thus, tank 63 with the bladder 71 for pressurizing tap water therein functions to balance the system as regards supply of tap water to the carbonator for carbonation and supply of tap water to the manifold M for blending with high carbonated water to supply low carbonated water or for delivery without blending with high carbonated water to serve an uncarbonated beverage, and enables operation even though tap water supply pressure may be low.

With regard to the carbonator 1, the float 107 floats on top of the carbonated water in the carbonator during idle or quiescent periods, providing a barrier between the $CO_2$ gas in the carbonator above the float and the surface of the carbonated water to prevent overcarbonation of the water. As noted above, it is desired to hold a supply of carbonated water in the carbonator with a carbonation factor of 4.0, for example. If the entire surface of the water were exposed to $CO_2$ gas in the carbonator, and assuming $CO_2$ pressure of 90 p.s.i. and water temperature of 70° F., during an overnight idle period the water might absorb additional $CO_2$ in amount such as to increase its carbonation factor to 6 or higher. This condition is aggravated if the water temperature is lower. However, the float prevents such absorption, and thereby prevents overcarbonation.

When the level of carbonated water in the carbonator goes down, the float 107 goes down with the water. However, it is prevented from sinking all the way down to the baffle 95 by engagement of sleeve 111 with the baffle, so as to provide space 115 as a quiescent zone. Tap water and $CO_2$ gas enter the carbonator above the float, and mix in the space 113 above the float. The float, having a specific gravity only slightly less than that of the water, stays down while the water which has entered the carbonator above the float absorbs $CO_2$. There is considerable agitation of the water above the float for intermixture of the $CO_2$ and the water. When the delivery of tap water to the carbonator ceases, and the carbonated water in the carbonator above the float becomes quiescent, the float rises back to the surface of the carbonated water to resume its anti-overcarbonation function. It is desirable that the float stay down while tap water is being delivered to the carbonator. If it rose during delivery of tap water, it would interfere with the efficiency of carbonation, by diminishing the volume in the carbonator above the float, and imposing a requirement for higher $CO_2$ pressure to attain the desired degree of carbonation. By making the float a low-buoyancy float, with a specific gravity only slightly less than that of the water, it is insured that the float stays down during the delivery of tap water to the carbonator.

It is to be noted that baffle 95 provides a lower quiescent zone 115 at the entrance to the outlet pipe 93, and the float 107 provides a second quiescent zone 115 between the baffle and the float. Carbonated water remains quiet in these zones despite the rather violent agitation of water entering the carbonator above the float. Accordingly, entrainment of gas bubbles in the stream of carbonated being drawn out of the carbonator through pipe 93 is avoided.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:
1. A beverage mixing and dispensing system comprising a mixer in which water and syrup may mix to constitute a beverage, a beverage delivery line extending from the mixer, a dispensing valve for said line, a blender for delivering a blend of carbonated water and tap water, or carbonated water per se, or tap water per se to the mixer, means for delivering syrup to the mixer, a carbonator, means for delivering carbonated water from the carbonator to the blender, a tap water pump, a line for delivering tap water from the outlet of the pump to the carbonator, said line having a shut-off valve therein, means defining a tap water chamber in communication with said line between the pump outlet and the shut-off valve, means for pressurizing tap water in said chamber, and a line for delivering tap water from the pump outlet to the blender.

2. A system as set forth in claim 1 having means responsive to demand for water by the carbonator to open the shut-off valve for delivery of tap water from said chamber to the carbonator, with the resultant drop in pressure of water in said chamber, and means responsive to drop in pressure of water in said chamber to actuate the pump.

3. A system as set forth in claim 1 wherein the carbonator comprises a pressure vessel adapted to hold a supply of carbonated water and having a $CO_2$ gas inlet at the top and an outlet for exit of the carbonated water under the pressure of $CO_2$ gas supplied via said $CO_2$ gas inlet, said first-mentioned line being connected to said vessel to deliver tap water to the top thereof, and a float adapted to float on top of carbonated water in the vessel providing a barrier between $CO_2$ gas in the vessel and the surface of the carbonated water in the vessel to prevent overcarbonation of the water during quiescent periods.

4. A system as set forth in claim 1 wherein said blender comprises a body having a valve rotatable in a cavity therein, a carbonated water inlet extending to said cavity, a tap water inlet extending to said cavity, and an outlet extending from said cavity, said valve having a transverse carbonated water passage and a transverse tap water passage, and being rotatable to set it in a first position wherein the carbonated water passage interconnects the carbonated water inlet and the outlet, and the tap water inlet is blocked, or in a second position wherein the tap water passage interconnects the tap water inlet and the outlet, and the carbonated water inlet is blocked, or in various intermediate positions wherein each of the carbonated water and tap water passages are in partial communication with the respective inlets and with the outlet.

5. A beverage mixing and dispensing system adapted for mixing and dispensing high carbonated beverage, low carbonated beverage, and noncarbonated beverage, comprising a plurality of mixers in each of which water and syrup may mix to constitute a beverge, a beverage delivery line extending from each mixer, a dispensing valve in each beverage delivery line, a plurality of blenders, one connected to each mixer, each adapted to deliver a blend of carbonated water and tap water, or carbonated water per se, or tap water per se to the respective mixer, means for delivering syrup to the mixers, a carbonator, means for delivering carbonated water from the carbonator to the blenders, a tap water pump, a line for delivering tap water from the outlet of the pump to the carbonator, said line having a shut-off valve therein, means defining a tap water chamber in communication with said line between the pump outlet and the shut-off valve, means for pressurizing tap water in said chamber, and a line for delivering tap water from the pump outlet to the blenders.

6. A system as set forth in claim 5 having a flow control valve between each blender and the respective mixer and a flow control valve in each means for delivering syrup.

7. A system as set forth in claim 5 wherein each blender and the respective mixer are assembled with a manifold block, said blocks being assembled and, as assembled, providing a carbonated water manifold and a tap water manifold, with passages from these manifolds to the blenders, the carbonated water manifold receiving carbonated water from the carbonator and the tap water manifold receiving tap water from the pump.

8. A system as set forth in claim 7 having a flow control valve assembled with each blender and mixer between the blender and mixer and a flow control valve assembled with each mixer for controlling flow of syrup to the mixer.

9. A system as set forth in claim 7 having means responsive to demand for water by the carbonator to open the shut-off valve for delivery of tap water from said chamber to the carbonator, with resultant drop in pressure of water in said chamber, and means responsive to drop in pressure of water in said chamber to actuate the pump.

10. A system as set forth in claim 7 wherein the carbonator comprises a pressure vessel adapted to hold a supply of carbonated water and having a $CO_2$ gas inlet at the top and an outlet for exit of the carbonated water under the pressure of $CO_2$ gas supplied via said $CO_2$ gas inlet, said first-mentioned line being connected to said vessel to deliver tap water to the top thereof, and a float adapted to float on top of carbonated water in the vessel providing a barrier between $CO_2$ gas in the vessel and the surface of the carbonated water in the vessel to prevent overcarbonation of the water during quiescent periods.

11. In a beverage dispensing system, a plurality of manifold blocks assembled end-to-end, said blocks having aligned end-to-end bores providing a carbonated water manifold and a tap water manifold, a plurality of blenders, one assembled with each block, each connected to said bores and adapted to deliver a blend of carbonated water and tap water, or carbonated water per se, or tap water per se, and a plurality of mixers, one assembled with each blender, and adapted to receive the delivery from the respective blender and mix it with syrup.

12. In a system as set forth in claim 11, a flow control valve assembled with each blender and mixer between the blender and mixer, and a flow control valve assembled with each mixer for controlling flow of syrup to the mixer.

13. In a system as set forth in claim 11, each blender comprising a body having a cavity therein, a valve rotatable in said cavity, a carbonated water inlet extending to said cavity, a tap water inlet extending to said cavity, and an outlet extending from said cavity, said valve having a transverse carbonated water passage and a transverse tap water passage, and being rotatable to set it in a first position wherein the carbonated water passage interconnects the carbonated water inlet and the outlet, and the tap water inlet is blocked, or in a second position wherein the tap water passage interconnects the tap water inlet and the outlet, and the carbonated water inlet is blocked, or in various intermediate positions wherein each of the carbonated water and tap water passages are in partial communication with the respective inlets and with the outlet.

14. A carbonator comprising a pressure vessel adapted to hold a supply of carbonated water and having a $CO_2$ gas inlet at the top and an outlet for exit of the carbonated water under the pressure of $CO_2$ gas supplied via said $CO_2$ gas inlet, said vessel also having a tap water inlet at the top for delivery of tap water into the vessel for mixture with $CO_2$ gas therein to replenish the supply of carbonated water, and a float adapted to float on top of the carbonated water in the vessel to provide a barrier between $CO_2$ gas in the vessel and the surface of the carbonted water in the vessel to prevent overcarbonation of the water during quiescent periods, said float being of a low-buoyance material having a specific gravity only slightly less than that of water.

15. A carbonator as set forth in claim 14 wherein the float is made of polyethylene having a specific gravity of about 0.910 to 0.925.

16. A carbonator comprising a pressure vessel adapted to hold a supply of carbonated water, said vessel having an inlet at the top for $CO_2$ gas under pressure, and an inlet at the top for tap water, a carbonated water outlet pipe extending down from the top of the vessel, and a float slidable on the pipe adapted to float on top of the carbonated water in the vessel to provide a barrier between $CO_2$ gas in the vessel and the surface of the carbonated water in the vessel to prevent overcarbonation of the water during quiescent periods, said float comprising a disk of material having a specific gravity only slightly less than that of water.

17. A carbonator as set forth in claim 16 wherein the disk is made of polyethylene having a specific gravity of about 0.910 to 0.925.

18. A carbonator comprising a cylindric pressure vessel adapted to hold a supply of carbonated water, said vessel having a baffle spaced from its bottom defining a quiescent zone with restricted communication from the space above the baffle to said zone, a carbonated water outlet pipe extending down from the top of the vessel and centrally thereof through the baffle to near the bottom of the vessel, a low-buoyancy float comprising a disk having a central opening receiving the pipe and slidable on the pipe, means for limiting downward movement of the disk so that there is a second quiescent zone between the baffle and the disk, said disk having a diameter slightly less than the inside diameter of said vessel for restricted communication between the space above the disk and said second quiescent zone, and said vessel having inlets at the top for $CO_2$ gas under pressure and tap water.

19. A carbonator as set forth in claim 18 wherein said disk is made of polyethylene having a specific gravity of about 0.910 to 0.925.

20. A blender for first and second fluids comprising a valve body having a valve cavity, a valve rotatable in said cavity, first and second inlets for said first and second fluid extending to said cavity, first and second transverse ports for said first and second fluids in said valve, and an outlet extending from said cavity, said valve being rotatable to set it in a first position wherein said first port interconnects said first inlet and the outlet, and said second inlet is blocked, or in a second position wherein said second port interconnects said second inlet and the outlet, and said first inlet is blocked, or in various intermediate positions wherein each port is in partial communication with the respective inlet and with the outlet, said valve being cylindrical, and the ports extending side-by-side parallel to one another on opposite sides of a diametrical plane of the valve, the inlet and outlet extending side-by-side to the cavity, and the outlet extending from the cavity in the central plane between the inlets and in the plane of said ports.

References Cited

UNITED STATES PATENTS

| | | | |
|---|---|---|---|
| 1,606,574 | 11/1926 | Hix | 222—129.1 |
| 2,412,107 | 12/1946 | Tannerhill | 103—25 |
| 2,575,267 | 11/1951 | Gottlieb. | |
| 2,838,077 | 6/1958 | Cooper | 222—145 X |
| 2,979,232 | 4/1961 | Wood | 222—129.1 |
| 2,986,306 | 5/1961 | Cocanour | 222—129.1 |
| 3,030,891 | 4/1962 | Taylor | 103—25 |
| 3,065,698 | 11/1962 | Andrew | 103—25 X |
| 3,215,312 | 11/1965 | Guzzi | 222—129.1 |
| 3,226,099 | 12/1965 | Black et al. | |
| 3,263,864 | 8/1966 | Welty et al. | 222—129 |

FOREIGN PATENTS

| | | |
|---|---|---|
| 594,829 | 7/1925 | France. |

SAMUEL F. COLEMAN, *Primary Examiner.*